(12) United States Patent
Perkins (10) Patent No.: US 9,749,072 B2
(45) Date of Patent: *Aug. 29, 2017

(54) END POINT PARAMETERIZATION MANAGEMENT OF GENERIC DEVICES

(71) Applicant: ClearOne, Inc., Salt Lake City, UT (US)

(72) Inventor: Roy C. Perkins, South Jordan, UT (US)

(73) Assignee: ClearOne, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,874

(22) Filed: Jul. 22, 2016

(65) Prior Publication Data

US 2017/0141863 A1 May 18, 2017

Related U.S. Application Data

(63) Continuation of application No. 14/986,688, filed on Jan. 3, 2016, now Pat. No. 9,628,206.

(60) Provisional application No. 62/099,470, filed on Jan. 3, 2015.

(51) Int. Cl.
*H04H 60/04* (2008.01)
*G06F 3/16* (2006.01)

(52) U.S. Cl.
CPC ............. *H04H 60/04* (2013.01); *G06F 3/165* (2013.01)

(58) Field of Classification Search
CPC ................................ H04H 60/04; G06F 3/165
See application file for complete search history.

(56) References Cited

U.S. PATENT DOCUMENTS

| | | | |
|---|---|---|---|
| 7,580,375 B1* | 8/2009 | Friedrich | H04L 12/1822 348/14.01 |
| 7,965,660 B2* | 6/2011 | Varesio | H04M 3/56 370/260 |
| 2006/0023900 A1* | 2/2006 | Erhart | H04S 1/002 381/119 |
| 2008/0226049 A1* | 9/2008 | Kumar | H04M 3/42187 379/202.01 |
| 2016/0197689 A1 | 7/2016 | Perkins et al. | |

* cited by examiner

*Primary Examiner* — Brenda Bernardi
(74) *Attorney, Agent, or Firm* — Matthew J. Booth PLLC; Matthew J. Booth (57) ABSTRACT

This disclosure describes a system that implements a multi-channel command and data processing device for multichannel data processing and transmission systems that are designed to connect to different types of data sources and sinks and describes a device configured to implement a novel endpoint parameter management architecture for generic devices. The system uses a multi-channel command and data processing device with one or more inputs and one or more outputs, with a processor and a memory, in communication with a data storage that manages endpoint parameters of one or more input devices and one or more output devices. The system further includes a data terminal and a plurality of endpoints.

20 Claims, 7 Drawing Sheets

| BLOCK | | PARAMETER | |
|---|---|---|---|
| NAME | NUMBER | NAME | NUMBER |
| LEVEL | 1 | GAIN_FINE | 1 |
| | | MUTE | 2 |
| | | RAMP_RATE | 3 |
| | | PHAN_PWR | 4 |
| | | AEC_REF | 5 |
| | | GAIN_COARSE | 6 |
| AEC | 2 | ENABLE | 1 |
| | | AEC_REF | 2 |
| | | NLP | 3 |
| | | PTT | 4 |
| | | PTT_THR | 5 |
| NC | 3 | ENABLE | 1 |
| | | DEPTH | 2 |
| FILTER | 4 | TYPE | 1 |
| | | FCY | 2 |
| | | GAIN | 3 |
| | | Q | 4 |
| | | BW | 5 |
| | | BYPASS | 6 |

| EPT | EPN | BN | PN | |
|---|---|---|---|---|
| MIC | 1 | LEVEL | MUTE | Text |
| 1 | 1 | 1 | 1 | Numeric |

| | NUM | TYPE | F1 | F2 | F3 | F4 | F5 | F6 | F7 | F8 |
|---|---|---|---|---|---|---|---|---|---|---|
| 502-1 | n-1 | T | EP | T | D | T | T | D | X | X |
| 502-2 | n | T | "MIC" | D | "GAIN" | D | X | X | X | X |
| 502-3 | n+1 | N | EP | D | D | D | D | X | X |

| NUM | R/W | P1 | P2 | P3 | P4 | P5 | P6 | P7 | P8 |
|-----|-----|----|----|----|----|----|----|----|-----|
| n−1 | W | F1 | F2 | F3 | F4 | F5 | F6 | X | X |
| n | W | "1" | F2 | "1" | "1" | F4 | X | X | X |
| n+1 | W | F1 | F2 | F3 | F4 | F5 | F6 | X | X |

| P1 | P2 | P3 | P4 | P5 | P6 | P7 |
|----|----|----|----|----|----|----|
| EPT | EPN | BN | PN | PV | MGSL | MSG |

| NUM | F1 | F2 | F3 | F4 | F5 | F6 | F7 | F8 | F9 |
|---|---|---|---|---|---|---|---|---|---|
| n-1 | EP | P1 | P2 | P3 | P4 | P5 | P7 | X | X |
| n | "MIC" | P2 | "GAIN" | P5 | P7 | X | X | X | X |
| n+1 | EP | P1 | P2 | P3 | P4 | P5 | P7 | X | X |

FIG. 8

END POINT PARAMETERIZATION MANAGEMENT OF GENERIC DEVICES

CROSS REFERENCE TO RELATED APPLICATIONS

This application claims priority and the benefits of the earlier filed Provisional U.S. application No. 62/099,470, filed on 3 Jan. 2015, which is incorporated by reference for all purposes into this specification.

Additionally, this application is a continuation of U.S. application Ser. No. 14/986,688, filed 3 Jan. 2016, which is incorporated by reference for all purposes into this specification.

TECHNICAL FIELD

This disclosure relates to the management of devices for systems that may be configured to include large numbers of inputs and outputs of various types. More specifically, this disclosure invention relates to the end-point parameter management architecture for audio routing and mixing systems and/or multi-channel data acquisition systems.

BACKGROUND ART

Audio mixers are commonly used for combining (also called "mixing"), routing, and changing the level, timbre, and/or dynamics of multiple audio data streams or signals received from different types of audio devices or computing devices. During operation, the audio mixers process different audio device types (e.g., microphone, output audio line, input audio line, Telco, VoIP, etc.), each being associated with a large number of configurable parameters. As a result, over a span of different audio device types, the audio mixers typically identify and control a massive number of parameters, which demand a complex software code for being handled and in turn cause the processing speed and performance of the audio mixers to significantly deteriorate. Further, if the number of device types and the parameters corresponding to each of those device types change for different product models or SKUs (i.e., stock-keeping units, each of which identifies a distinct product model or product type) of audio mixers, then the corresponding software code needs to be changed and recompiled for each model. This adds to the burden of managing a code library for different product SKUs.

The disclosed invention also has applicability in other environments as well. Multi-channel data acquisition systems have a limited use in multi-vendor and multi-device environments. For example, a HVAC heating and air conditioning system provides various information about its input and output airflows that needs to be managed with the input from temperature sensors. A further extension of this system could be combining the data from these systems with for example a commercial and/or residential security/lighting/audio and video system. But as previously discussed, an impossible burden arises when dealing with such disparate systems from multiple vendors.

Therefore, there exists a need for systems and methods implementing a robust endpoint parameter management architecture, which is simple, efficient, and flexible to use, configure, and control, for audio mixers and/or multi-channel data acquisition.

SUMMARY OF INVENTION

This disclosure describes systems and methods that implement multi-channel command and data processing device for multichannel data processing and transmission systems that are designed to connect to different types of data sources and sinks and describes a device configured to implement a novel endpoint parameter management architecture for generic devices. The system uses a multi-channel command and data processing device with one or more inputs and one or more outputs, with a processor and a memory, in communication with a data storage for managing endpoint parameters of one or more input devices and one or more output devices. The system further includes a data terminal providing a plurality of data files including configuration parameters of endpoints. In addition, the system provides a plurality of endpoints connected to one or more input devices and output devices, where the plurality of endpoints comprising a first endpoint having first endpoint type and a second endpoint having second endpoint type. Further, the system provides that the multi-channel command and data processing device in communication with the data terminal and the plurality of endpoints, where the multi-channel command and data processing device is configured to:

receive the plurality of data files from the data terminal;

process the plurality of data files to obtain a first set of configuration parameters corresponding to the first endpoint and a second set of configuration parameters corresponding to the second endpoint;

convert each of the first set of configuration parameters and the second set of configuration parameters into a predefined common data format; and organize each of the converted first set and second set of configuration parameters into a generic data structure, where the generic data structure being compatible with both the first endpoint type and the second endpoint type.

This disclosure further provides that the system includes the generic data structure is represented in a text format, a numeric format, or both.

Additionally, this disclosure provides that the system includes the generic data structure having predefined parameter fields selected from a group comprising of an endpoint type, an endpoint number, a parameter block number, and a parameter number.

Further, this disclosure provides that the system provides the first set of configuration parameters is represented in a first data structure and the second set of configuration parameters is represented in a second data structure, where the multi-channel command and data processing device is further configured to verify the first data structure and the second data structure using a predetermined command format table.

And, this disclosure provides that the multi-channel command and data processing device is further configured to: translate the predefined common data structure into a machine-level communications packet having a plurality of parameter fields; extract values of predetermined parameter fields among the plurality of parameter fields of the machine-level communications packet; create a response format table based on the extracted values of predetermined fields; and display the created response format table into a predefined command format table.

Other and further aspects and features of the disclosure will be evident from reading the following detailed description of the embodiments, which are intended to illustrate, not limit, the present disclosure.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

This disclosure describes systems and methods that implement a multi-channel command and data processing device for multichannel data processing and transmission systems that are designed to connect to different types of data sources and sinks and describes a device configured to implement a novel endpoint parameter management architecture for generic devices. The disclosed embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the included claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative functional units includes logical blocks, modules, and circuits described in connection with the embodiments disclosed herein so as to more particularly emphasize their implementation independence. The functional units may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, any conventional processor, controller, microcontroller, or state machine. A general purpose processor may be considered a special purpose processor while the general purpose processor is configured to fetch and execute instructions (e.g., software code) stored on a computer readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the various illustrative functional units previously described above may include software or programs such as computer readable instructions that may be described in terms of a process that may be depicted as a flowchart, a flow diagram, a structure diagram, or a block diagram. The process may describe operational acts as a sequential process, many of these acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second element does not mean that only two elements may be employed or that the first element must precede the second element in some manner. In addition, unless stated otherwise, a set of elements may comprise one or more elements.

Reference throughout this specification to "one embodiment", "an embodiment" or similar language means that a particular feature, structure, or characteristic described in connection with the embodiment is included in at least one embodiment of the present invention. Thus, appearances of the phrases "one embodiment", "an embodiment" and similar language throughout this specification may, but do not necessarily, all refer to the same embodiment.

In various embodiments of the present disclosure, definitions of one or more terms that will be used in the document are provided below.

In one embodiment, an endpoint refers to one or more devices (e.g., microphone, speaker, calling devices such as mobile phone, video phone, and internet phone, etc.) or computing devices (e.g., desktop PC, personal digital assistant, server, mainframe computer, mobile computing device, internet appliance, etc.) that are capable of exchanging audio and/or data streams either independently or in combination with video, textual, or symbolic data in a communication session.

In another embodiment, an endpoint could also refer to a device like a thermocouple, a pressure sensor, a light sensor, a magnetic field detector, an automotive instrument panel, a commercial and/or residential audio/video/lighting system that accepts commands to turn on or off, a Blu-Ray video player that accepts commands to play a disc or stop media playback, or computing devices described above that capable of exchanging analog and/or digital data streams either independently or in combination video, textual, symbolic data, or other data streams in a communication session.

Embodiments are disclosed in the context of an audio mixer system capable of managing parameters of a plurality of endpoints that may include a first endpoint and a second endpoint. Other embodiments may be applied in the context of various use cases, involving configuration parameters management. For example, another embodiment could be a multi-channel data acquisition system. Another embodiment could be a control system designed to ingest commands from a lighting control panel from one vendor and translate those commands into a different command format so that they could be understood by lighting control endpoints from a different vendor using a different command format and syntax. Yet another embodiment is a CAN bus control system for automotive control that allows sensors from one vendor to send commands that are translated into a format that can be understood by an automotive instrument panel from a different vendor. And yet another embodiment is an HVAC heating and air conditioning system from one vendor and a master system such as a StreamNet audio/video system from ClearOne's NetStreams division. And yet another embodiment is a commercial and/or residential indoor and outdoor lighting/appliance/security/audio and video control system that connects multiple vendor products. Disclosed embodiments are in the context of an audio mixer and/or multi-channel data acquisition system capable of receiving, organizing, and converting endpoint configuration parameters and/or data structures in data files. The numerous references in the disclosure to the device for an audio mixer and/or multi-channel data acquisition are intended to cover any and/or all devices capable of performing respective operations on endpoints in an environment relevant to the applicable context, regardless of whether or not the same are specifically provided.

Figure 1:
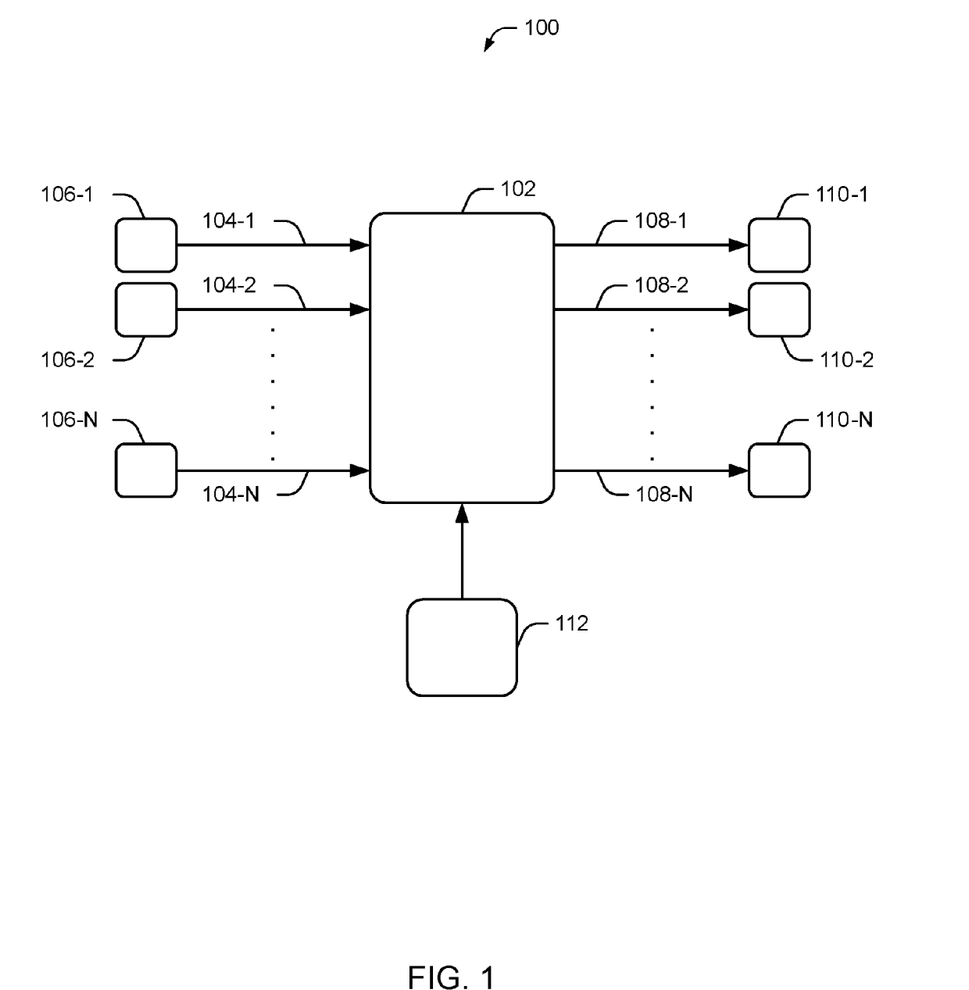
FIG. 1 is a schematic that illustrates a system for implementing an embodiment of the disclosed invention.

FIG. 1 is a schematic that illustrates a system 100 for implementing an enhanced audio mixer and/or multi-channel data acquisition 102 configured to implement an endpoint parameter management (EPM) architecture. Some embodiments are in the context of environments that represent an audio conference among multiple users via respective endpoints capable of providing or processing, or both, audio streams in a communication session. However, other embodiments may be applied in the context of other scenarios (e.g., a video conference, a webinar, a multiplayer online game, etc.) involving at least one of video, textual, or symbolic (e.g., emoticons, images, etc.) data being communicated along with the audio streams among various endpoints in the same communication session. In some embodiments, at least one of the endpoints may execute a unified communication application (UC application) during the session. Other embodiments are in the context of multi-channel data acquisition systems amount one or more analog or digital data input devices and one or more analog or digital data output devices.

One embodiment of the disclosed invention describes a system 100 that may comprise an audio mixer 102 receiving one or more input audio streams 104-1, 104-2, . . . , 104-N (collectively, input audio streams 104) from input endpoints 106-1, 106-2, . . . , 106-N (collectively, input endpoints 106) respectively, and generate output audio streams 108-1, 108-2, . . . , 108-N (collectively, output audio streams 108) being supplied to output endpoints 110-1, 110-2, . . . , 110-N (collectively, output endpoints 110) respectively.

Another embodiment of the disclosed invention describes a system 100 that may comprise a multi-channel data acquisition system 102 receiving one or more input analog and/or digital data streams 104-1, 104-2, . . . , 104-N (collectively, input data streams 104) from input endpoints 106-1, 106-2, . . . , 106-N (collectively, input endpoints 106) respectively, and generate output analog and/or digital data streams 108-1, 108-2, . . . , 108-N (collectively, output data streams 108) being supplied to output endpoints 110-1, 110-2, . . . , 110-N (collectively, output endpoints 110) respectively.

The audio mixer and/or multi-channel data acquisition 102 may be in communication with a data terminal 112 over a network (not shown). The network may comprise, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may comprise multiple networks or sub-networks, each of which may comprise, for example, a wired or wireless data pathway. The network may comprise a circuit-switched voice network, a packet-switched data network, or any other network that is able to carry electronic communications. For example, the network may comprise networks based on the Internet protocol (IP) or asynchronous transfer mode (ATM), and may support voice using, for example, VoIP, Voice-over-ATM, or other comparable protocols used for voice data communications. In some embodiments, the network may comprise a cellular telephone network configured to enable exchange of audio data either alone or in combination with textual data, audio data, video data, or any combination thereof between the input endpoints 106 and the output endpoints 110.

The data terminal 112 may be any computing device known in the art, related art, or developed later and may comprise or be coupled with one or more hardware devices either wirelessly or in a wired fashion for enabling a user to dynamically interact with other users, user devices, or other devices via the audio mixer and/or multi-channel data acquisition 102 connected to the network. For example, the data terminal 112 may be coupled with the input endpoints 106, the output endpoints 110, an imaging device (including, but are not limited to, a video camera, a webcam, a scanner, or any combination thereof), a display device (e.g., a monitor, a screen, etc.), and data input devices (e.g., a keyboard, a touchscreen, a stylus, a mouse, etc.). The data terminal 112 may be compatible with any other device (not shown) connected to the network to process and exchange audio, video, textual, symbolic data, analog and/or digital data streams with each other or any other compatible devices. The data terminal 112 may be, or include a multipoint control unit (MCU), configured to create a logical representation of one or more hardware devices such as the input endpoints 106 and the output endpoints 110 to provide endpoint information (e.g., endpoint type, endpoint number or identifier, functional parameters, parameter numbers or identifiers, etc.) to the audio mixer and/or multi-channel data acquisition 102. In another embodiment, the data terminal 112, or an included MCU, may be configured to establish a communication bridge or channel with the input endpoints 106, output endpoints 110, or any other compatible network devices. In yet another embodiment, the data terminal 112, or an included MCU, may be configured to store and manage the audio and/or data streams being processed by the audio mixer and/or multi-channel data acquisition 102. In still another embodiment, the data terminal 112, or an included MCU, may be configured to request services from or deliver services to, or both, various devices connected to the network. In some embodiments, the audio mixer and/or multi-channel data acquisition 102 may be connected as a peripheral device or integrated to the data terminal 112.

The audio mixer and/or multi-channel data acquisition 102 may be preconfigured or dynamically configured to implement a novel endpoint parameter management architecture that is independent of the types of endpoints and related parameter data structures (e.g., command formats) or software codes. The audio mixer and/or multi-channel data acquisition 102 may be configured to convert communications, which may include instructions, commands, queries, data, etc., from the data terminal 112 into a generic data structure, discussed below in greater detail, to make these communications compatible with the audio mixer and/or multi-channel data acquisition 102, and vice versa, through the endpoint parameter management architecture. Consequently, the audio mixer and/or multi-channel data acquisition 102 may allow implementation of the data terminal 112 to employ different technologies, protocols, or software codes using a proprietary technology managed by different organizations, e.g., a third-party vendor.

The endpoint parameter management architecture may organize the parameters received in any data structure (e.g., a command format known in the art, related art, or developed later, which may be compatible with the audio mixer and/or multi-channel data acquisition 102 and received from any endpoint type) into a common generic data structure or command format. Accordingly, the endpoint parameter management architecture may offer a single command format or a single data structure that may enable faster command processing independent of the input command or parameter set, thereby improving the configuration parameter response in complex or large systems. The endpoint parameter management architecture may further provide intuitive user commands sent over serial communications path that access the generic data structure. Such intuitive user commands enable endpoint configuration parameters to be accessible, modifiable, compatible, either alone or in any combination thereof, with the audio mixer and/or multi-channel data acquisition 102 without changing or recompiling the software codes upon being implemented on the audio mixer and/or multi-channel data acquisition 102 for handling the configuration parameters. Therefore, the use of such architecture may significantly improve human readability of serial commands, to allow the use of sophisticated serial commands; and reduce the complexity of the software codes for handling the parameters.

The audio mixer and/or multi-channel data acquisition 102 may be implemented as a standalone and dedicated device including hardware and installed software, where the hardware may be closely matched to the requirements and/or functionality of the software. Alternatively, the audio mixer and/or multi-channel data acquisition 102 may be implemented as a software application or a device driver. In some embodiments, the audio mixer and/or multi-channel data acquisition 102 may enhance or increase the functionality and/or capacity of the network to which it is connected. In some other embodiments, the audio mixer and/or multi-channel data acquisition 102 may be configured to expose its computing environment or operating code to the user, and may comprise related art I/O devices, such as camera, speaker, scanner, keyboard, display, or any combination thereof. The audio mixer and/or multi-channel data acquisition 102 may, however, comprise software, firmware or other resources that support remote administration and/or maintenance of the endpoint parameter management architecture.

In some embodiments, the audio mixer and/or multi-channel data acquisition 102 either in communication with any of the networked devices such as the data terminal 112, or independently, may have voice along with video and data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), lighting control panel systems, CAN bus control systems, HVAC heating and air conditioning systems, commercial and/or residential indoor and outdoor lighting/appliance/security/audio and video control system or any other type of hardware, in any combination thereof. In some embodiments, the audio mixer and/or multi-channel data acquisition 102 may comprise or implement one or more real time protocols and non-real time protocols known in the art, related art, or developed later to facilitate communication of audio and other data streams between the input endpoints 106 and the output endpoints 110, or any other compatible network devices.

The audio mixer and/or multi-channel data acquisition 102 may be powered by an external power supply unit, such as an external battery or a controlled AC supply that may be electrically connected to the audio mixer and/or multi-channel data acquisition 102 from the data terminal 112, the input endpoints 106 or the output endpoints 110 via a suitable wired link (such as via a USB cable) or wireless link to draw power for operation.

In some embodiments, the audio mixer and/or multi-channel data acquisition 102 may be operatively connected or integrated with any network appliance (not shown) configured to establish a network between the audio mixer and/or multi-channel data acquisition 102 and any endpoint or a computing device such as the data terminal 112. At least one of the audio mixer and/or multi-channel data acquisition 102 and the network appliance may be capable of operating as or providing an interface to assist exchange of software instructions and/or audio streams between the audio mixer and/or multi-channel data acquisition 102 and the data terminal 112.

In some embodiments, the network appliance may be preconfigured or dynamically configured to include or control the audio mixer and/or multi-channel data acquisition 102 integrated with other devices. For example, the audio mixer and/or multi-channel data acquisition 102 may be integrated with the data terminal 112 or any other computing device (not shown) connected to the network. The data terminal 112 may comprise a module (not shown), which may enable the audio mixer and/or multi-channel data acquisition 102 being introduced to the network appliance, thereby enabling the network appliance to invoke or control the audio mixer and/or multi-channel data acquisition 102 as a service. Examples of the network appliance may include, but are not limited to, a DSL modem, a wireless access point, a set-top box, a router, a base station, and a gateway having a predetermined computing power sufficient for implementing the audio mixer and/or multi-channel data acquisition 102.

In some embodiments, the audio mixer and/or multi-channel data acquisition 102 may be installed on or integrated with one or more devices, e.g., input endpoints 106 or output endpoints 108. In some other embodiments, the audio mixer 102 may be integrated with any number of devices in a distributed fashion such as being integrated with or installed on the audio devices, e.g., the input endpoints 106 or the output endpoints 108, and the data terminal 112. In a further embodiment, the audio mixer and/or multi-channel data acquisition 102 may include one or more processors and various types of memory and storage devices that are typically found in a variety of user communication devices and user computing devices known in the art, related art, or developed later. In another embodiment, the audio mixer and/or multi-channel data acquisition 102 may be installed on, integrated or operatively associated with a server (not shown) connected to the network. The server may be implemented as any of a variety of computing devices including, for example, a general purpose computing device, multiple networked servers (arranged in clusters or as a server farm), a mainframe, or so forth.

Figure 2:
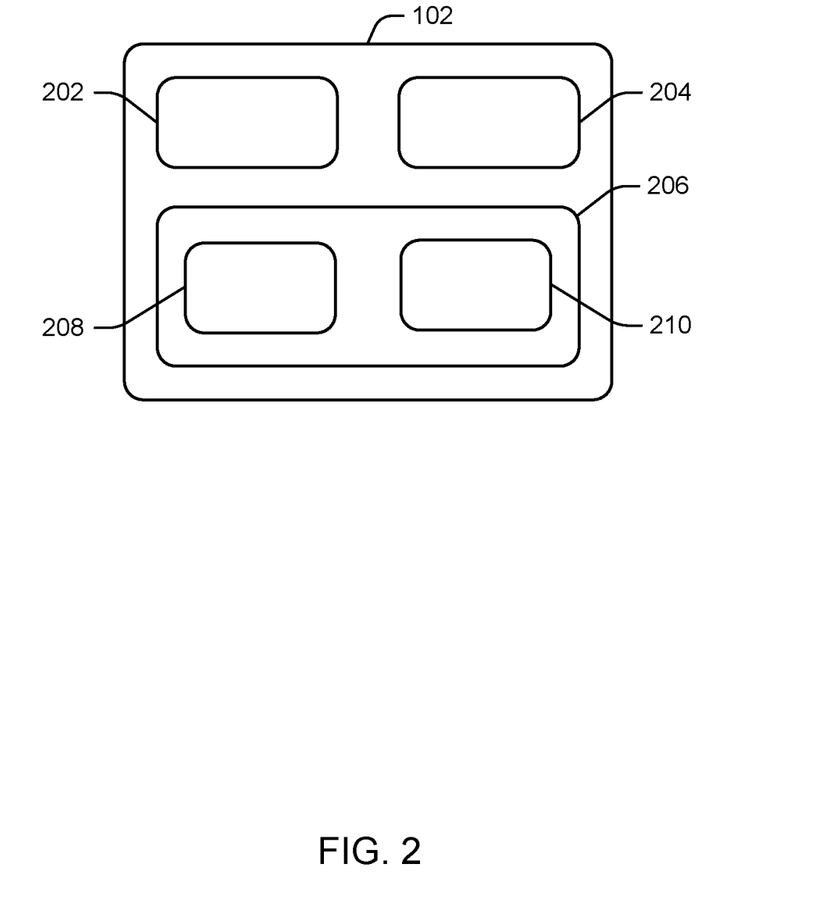
FIG. 2 is another schematic that illustrates an embodiment of the disclosed invention.

FIG. 2 illustrates an exemplary audio mixer and/or multi-channel data acquisition 102. The audio mixer and/or multi-channel data acquisition 102 may be implemented as a single physical device (e.g., a computing device, a processor or an electronic storage device) or a combination of multiple physical devices that are operatively connected or networked together. The audio mixer and/or multi-channel data acquisition 102 may be implemented in hardware or a suitable combination of hardware and software. In some embodiments, the audio mixer and/or multi-channel data acquisition 102 may be a hardware device including processor(s) 202 executing machine readable software instructions for handling audio streams received from the input endpoints 106. The hardware may comprise a combination of discrete components, an integrated circuit, an application-specific integrated circuit, a field programmable gate array, a digital signal processor, or other suitable hardware. The software may comprise one or more objects, agents, threads, lines of code, subroutines, separate software applications, two or more lines of code or other suitable software structures operating in one or more software applications or on one or more processor(s) 202. The processor(s) 202 may include, for example, microprocessors, microcomputers, microcontrollers, digital signal processors, central processing units, state machines, logic circuits, and/or any devices that manipulate signals based on operational instructions. Among other capabilities, the processor(s) 202 may be configured to fetch and execute computer readable instructions in a system memory such as a storage unit 206 associated with the audio mixer and/or multi-channel data acquisition 102 for performing tasks such as signal transcoding, data processing, input/output processing, power control, and/or other functions.

In some embodiments, the audio mixer and/or multi-channel data acquisition 102 may include, in whole or in part, a software application working alone or in conjunction with one or more hardware resources. Such software applications may be executed by the processor(s) 202 on different hardware platforms or emulated in a virtual environment. Aspects of the audio mixer and/or multi-channel data acquisition 102 may leverage known, related art, or later developed off-the-shelf software. Other embodiments may comprise the audio mixer and/or multi-channel data acquisition 102 being integrated or in communication with a mobile switching center, network gateway system, Internet access node, application server, IMS core, service node, or some other communication systems, including any combination thereof.

The audio mixer and/or multi-channel data acquisition 102 may include a variety of known, related art, or later developed interface(s) 204, including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

The audio mixer and/or multi-channel data acquisition 102 may operate in communication with the storage unit 206, which may comprise any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. In some embodiments, the storage unit 206 may be installed on, integrated with, or operatively connected to the data terminal 112. In some other embodiments, the storage unit 206 may be installed on, integrated with, or operatively connected to a server (not shown), a network appliance (not shown), or any other networked device.

In some embodiments, the storage unit 206 may include one or more databases 208 and an endpoint parameter management (EPM) module 210. The one or more databases 208 may be sub-divided into further databases for storing electronic files and data. The storage unit 206 may have one of many database schemas known in the art, related art, or developed later. For example, a database may have a relational database schema involving a primary key attribute and one or more secondary attributes. In some embodiments, the audio mixer and/or multi-channel data acquisition 102 may perform one or more operations, but not limited to, reading, writing, indexing, encoding, decoding, manipulating and updating the audio and/or data streams, and may communicate with various networked computing devices such as the data terminal 112, which may be separately located or integrated with the input endpoints 106 or the output endpoints 110, or both.

The EPM module 210 may be implemented as a field programmable gate array (FPGA), an erasable programmable logic device (EPLD), a system on a chip (SOC), or any other type of device known in the art, related art, or developed later. In other embodiments, the EPM module 210 may be implemented as a software application or device driver. The EPM module 210 may receive configuration parameters (e.g., GAIN_FINE, MUTE, RAMP_RATE, etc.) in various command formats from the data terminal 112 via any of the suitable interface(s) 204, where the configuration parameters may correspond to various types of endpoints such as the input endpoints 106 or output endpoints 110. For example, the EPM module 210 may receive the configuration parameters via a serial bus such as a Universal Serial Bus (USB) from the data terminal 112.

The EPM module 210 may be configured to organize the configuration parameters associated with each audio device type into a predefined data structure, which may be converted into a generic data structure or command format that is compatible with the audio mixer and/or multi-channel data acquisition 102 and any endpoint that exchanges a command pair with the audio mixer and/or multi-channel data acquisition 102. The command pair may include (1) a set of configuration parameters received by the audio mixer and/or multi-channel data acquisition 102 from an endpoint such as the input endpoint 106, and (2) a parameter response received by the endpoint such as the input endpoint 106 in response to the receipt of the set of configuration parameters from the audio mixer and/or multi-channel data acquisition 102.

Such generic data structure may be based on various predefined or dynamically defined categories or parameter fields associated with each of the endpoints such as the input endpoints 106 or the output endpoints 110. In one example, the generic data structure or command format may be based on endpoint type (EPT), endpoint number (EPN), block number (BN), and parameter number (PN).

EPT may refer to a formal name given to an audio and/or data device type or endpoint type (e.g., a microphone, an output line, VoIP (Voice over IP), etc.) by the EPM module 210. Each of such endpoint types may be referenced by a number and a text abbreviation in a table and stored in the databases 208. For example, in a table 300 illustrated in FIG. 3A, a microphone may be referenced by a number "1" and a text abbreviation "MIC" in the first row 302-1. Similarly, an input line (e.g., a serial bus providing an audio stream to the audio mixer 102) may be referenced by "2" and "INPUT" in the second row 302-2, and an output line (e.g., a serial bus carrying an audio stream generated by the audio mixer 102) may be referenced by "3" and "OUTPUT" in the third row 302-3.

EPN may refer to a specific number of the endpoint type referenced in the databases 208. The endpoint number, EPN, may be referenced in text or numeric form in a table, which is stored in the database. For example, if there are 5 microphones, then each of them may be identified individually by their EPN, e.g., from 1 to 5. Therefore as illustrated in a table 320 of FIG. 3B, microphones 1 to 5 may be referenced by "MIC 1," "MIC 2," "MIC 3," "MIC 4," and "MIC 5" in the text format or by "1 1," "1 2," "1 3," "1 4," and "1 5" in numeric format.

Further, all configuration parameters associated with an endpoint type may be organized into blocks of similar function or function type with a corresponding number in a table, which may be stored in the databases 208. As such, BN may refer to a parameter block number to which a particular configuration parameter belongs. For example as illustrated in a table 340 of FIG. 3C, a function type or block name "LEVEL" may be associated with a block number "1."

Figure 3A:
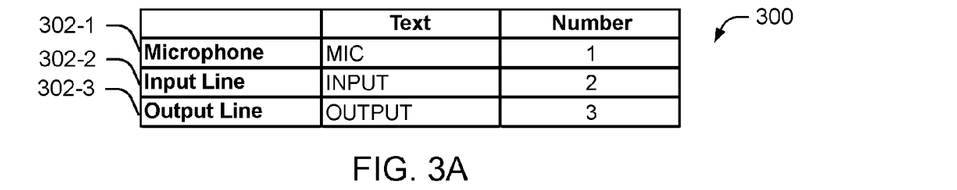
FIGS. 3A-3E illustrate tables representing text and numeric representations of an endpoint type (EPT), endpoint number (EPN), block number (BN), and parameter number (PN) of an exemplary generic data structure.
Figure 3B:
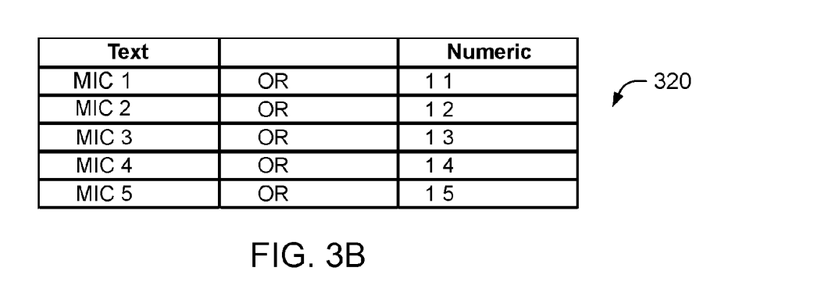
Figure 3C:
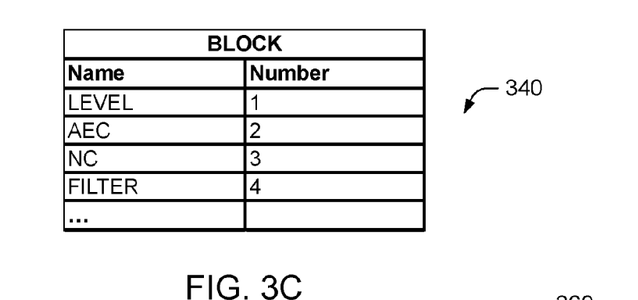
Figure 3D:
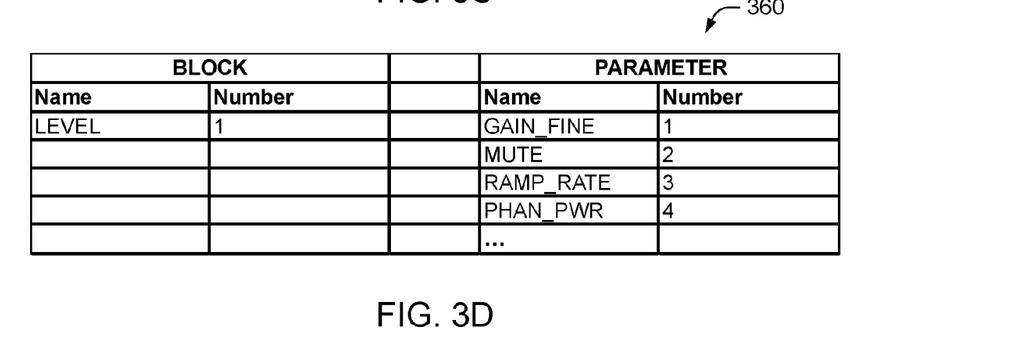

Similarly, the block names "AEC," "NC," and "FILTER" may be associated with block numbers "2," "3," and "4" respectively.

PN may refer to a number (or name) associated with each parameter within a specific block number (BN). Each configuration parameter may be identified and collected with other parameters of similar functionality and associated under one of the Block Numbers such as those mentioned above. For example as illustrated in table 360 of FIG. 3D, multiple parameters may be represented by name and a number within a Block Name "LEVEL" associated with a number "1." Examples of such parameters may include, but not limited to, "GAIN_FINE" represented by number "1," "MUTE" represented by number "2," "RAMP_RATE" represented by number "3," and "PHAN_PWR" represented by number "4" and so on.

Figure 3E:
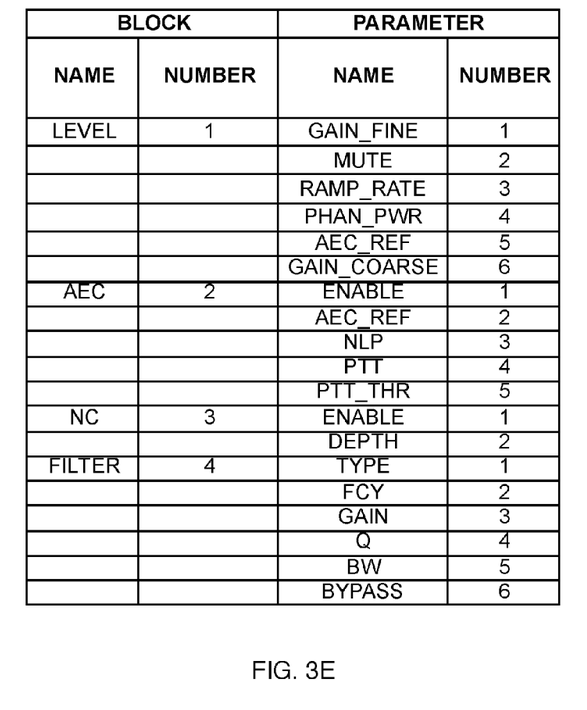

FIG. 3E is an example of organizing the tables of FIG. 3A-3D into a single structure.

Figure 4:
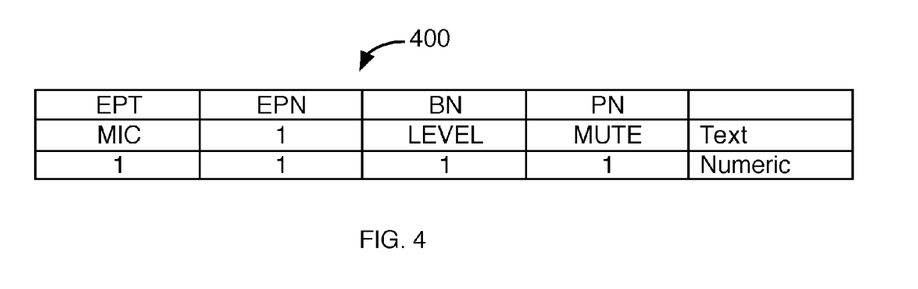
FIG. 4 illustrates representation of an exemplary generic data structure.

With the above in mind, FIG. 4 illustrates a generic data structure having a single or only one command format, hereinafter referred to as a base command format, may be developed using EPT, EPN, BN, and PN to represent the configuration parameters associated with any endpoint type. As example, we can create a configuration parameter "GAIN_FINE" for a microphone that is illustrated by Table 400 in FIG. 4, which shows a configuration parameter being represented in both text and numeric formats in the base command format. As illustrated, EPT is a first microphone shown as "MIC" in text and "1" numerically, where the first "1" may refer to the first microphone. Further, BN is shown as "LEVEL" in text and "1" numerically. Similarly, PN is shown as "MUTE" in text and "1" numerically. Such base command format provides a compact numeric format to represent configuration parameters from any endpoint type and may be useful for a low-level machine-to-machine connection, e.g., over Ethernet. On the other hand, the text version of the base command format is more intuitive for direct user control and easy human comprehension.

The base command format may be implemented using any suitable programming language known in the art, related art, or developed later. For example, the EPM module 210 may implement the base command format contained in a single object class in C++ programming language. Further, each endpoint may be defined (based on its configuration parameters arranged in the base command format) in a separate table, which may be saved as an endpoint structure file or endpoint data file (e.g., in comma separated value or CSV format) by the EPM module 210.

The base command format may allow for its modification by incorporating corresponding updates in the individual endpoint structure files such as those shown in FIGS. 3A-3E without any changes in the software code for the EPM module 210 or the base command format. The individual tables defining endpoints in the endpoint structure files also allow to enhance readability of user generated commands sent over a serial communications path (e.g., a serial bus) from the data terminal 112 or any other networked device to the audio mixer and/or multi-channel data acquisition 102 for accessing the base command format. Therefore, all digital audio and/or data mixing parameters or configuration parameters of each endpoint can be organized into a single endpoint data structure using just four categories or parameter fields of the base command format illustrated in FIG. 4.

During operation, the EPM module 210 may receive the user generated commands to access a base command format corresponding to an endpoint, e.g., an input endpoint or an output endpoint. Such access may allow a user to add (or create), delete, or modify any value in the base command format. The EPM module 210 may receive the user generated commands in a COMMAND FORMAT TABLE and convert it into an equivalent table in a command data file, which may be in a CSV format; however, any other suitable file format known in the art, related art, or developed later may be implemented. The command data file may allow easy portability of user generated commands across different models or varieties of audio mixers compatible with the base command format, without individual software coding on each audio mixer and automate implementation of user desired configuration on different audio mixers by the command data file including the user generated commands in the COMMAND FORMAT TABLE being executed by respective EPM modules.

The EPM module 210 may execute the command data file to access a COMMAND FORMAT TABLE that is used to identify a legal command type and format received from the data terminal 112. The EPM module 210 may receive the same serial command in three different command formats, as shown in equations 1, 2, and 3, from the data terminal 112. In some embodiments, the EPM module 210 may receive such serial command in different command formats from the server.

$$\text{EP MIC 1 LEVEL GAIN\_FINE-5} \tag{1}$$

$$\text{MIC 1 GAIN-5} \tag{2}$$

$$\text{EP 1 1 1 1-5} \tag{3}$$

The command formats shown in equations 1, 2, and 3 for the same serial command may be provided by a user to the audio mixer and/or multi-channel data acquisition 102 via e.g., a serial port, such as a USB port, on the data terminal 112 over any commercial terminal emulator application. Equations 1, 2, and 3 show different representations in which a single command can be written and entered by the user.

Figure 5:
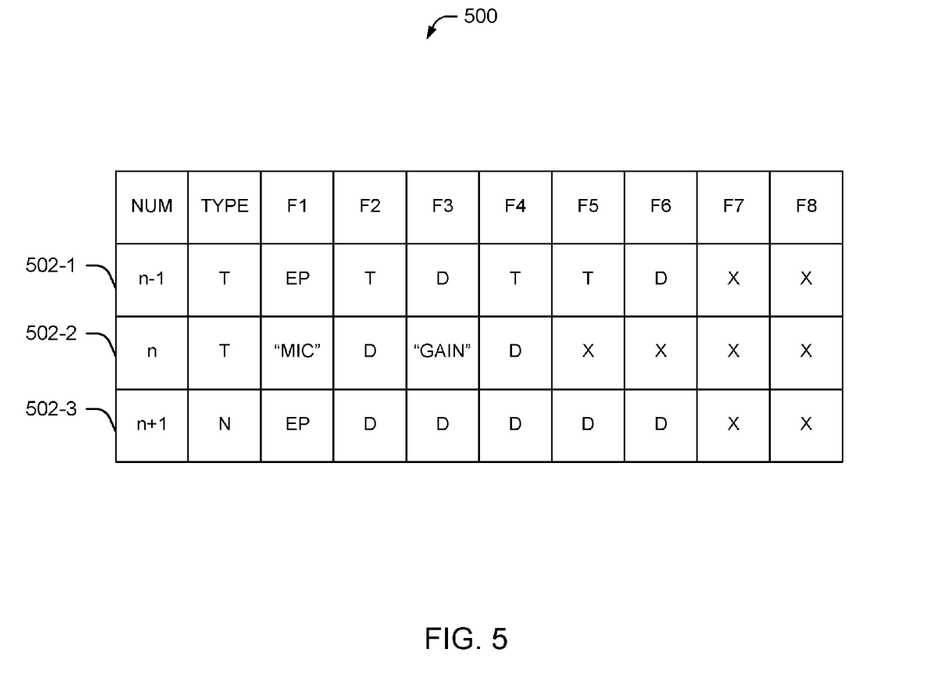
FIG. 5 illustrates an exemplary command format table of an endpoint parameter management architecture.

The EPM module 210 uses the command format table as shown in FIG. 5 to identify a command and its format to determine if the format is legal or correct. In the table 500, the equation 1 is represented in the first row 502-1, the equation 2 is represented in the second row 502-2, and the equation 3 is represented in the third row 502-3 of the table 500. Therefore, the command format table 500 may allow the user to add (or create), delete, or modify the base command format. Further, the conversion of the command format table 500 into a command data file, allows the received serial command to be represented in any of the various formats known in the art, related art, or developed later compatible with the EPM module 210 by simply having the EPM module 210 to update command data file, without any change in the software code of the EPM module 210, for the changes made in the command format table 500. Such direct change in the serial command based on update in the command data files may provide significant flexibility to make the command formats user-configurable with absolutely no changes necessary in the software code of the EPM module 210. It may also enable to introduce new types of serial commands from the data terminal 112 while maintaining the audio mixer and/or multi-channel data acquisition 102 to be compatible with the data terminal 112 and/or other network device such as input endpoints 106.

Figure 6:
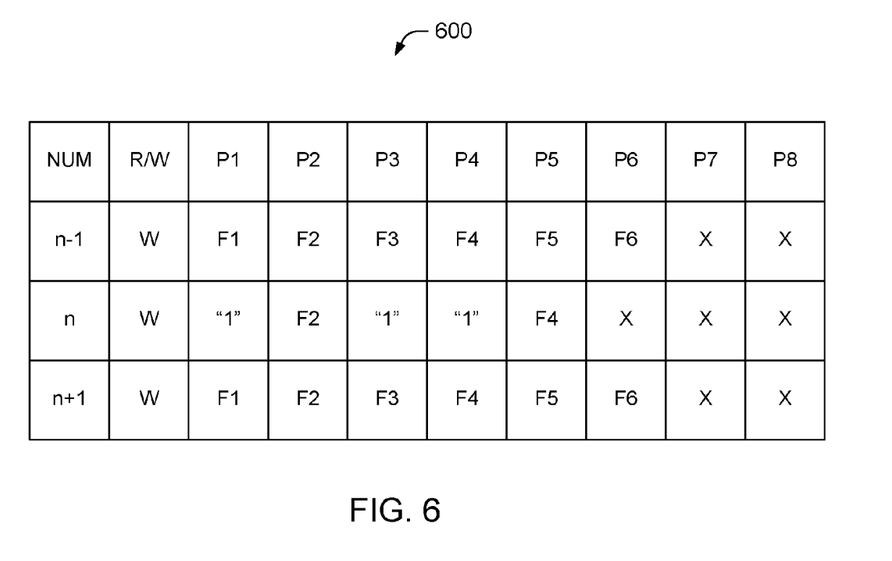
FIG. 6 illustrates an exemplary command translation table of the endpoint parameter management architecture.
Figure 7:
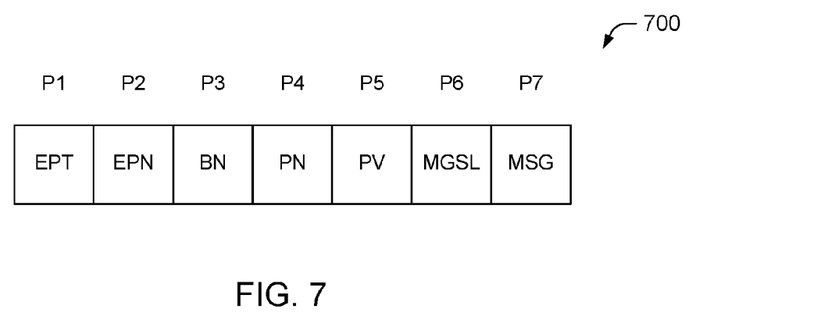
FIG. 7 illustrates an exemplary internal communications packet format of the endpoint parameter management architecture.

Once the correctness of the received command formats is validated by the EPM module 210 using the command format table 500, the EPM module 210 may provide a command translation table 600 being indexed based on specific row numbers of the command format table 500. The command translation table 600, as illustrated in FIG. 6, may organize the configuration parameters received with various command formats, and correspondingly the associated endpoint types, into a predefined data structure that is common for all command formats received by the EPM module 210. The command translation table such as the table 600 may enable the EPM module 210 to translate and place fields of the received serial command(s) into appropriate fields of an internal communications packet 700, illustrated in FIG. 7. The internal communications packet 700 may interface directly with the base command format stored in the databases 208. The internal communications packet such as the packet 700 may represent a machine-level or low-level communications packet that may be used directly by the EPM module 210 for further processing.

Once a valid command format has been identified in the command format table 500, by the specific row number, then that same row number identifies the correct row to be used in the second table, i.e., the command translation table 600, in order to correctly form the internal communications packet 700. The same row number is then used to index to an appropriate row in a third table, known as a response format table as shown in table 800 of FIG. 8, so that the EPM module 210 can extract and convert specific fields of the internal communications packet 700 to a predefined response format for being reviewed by a user via the data terminal 112 or the server.

Figure 8:
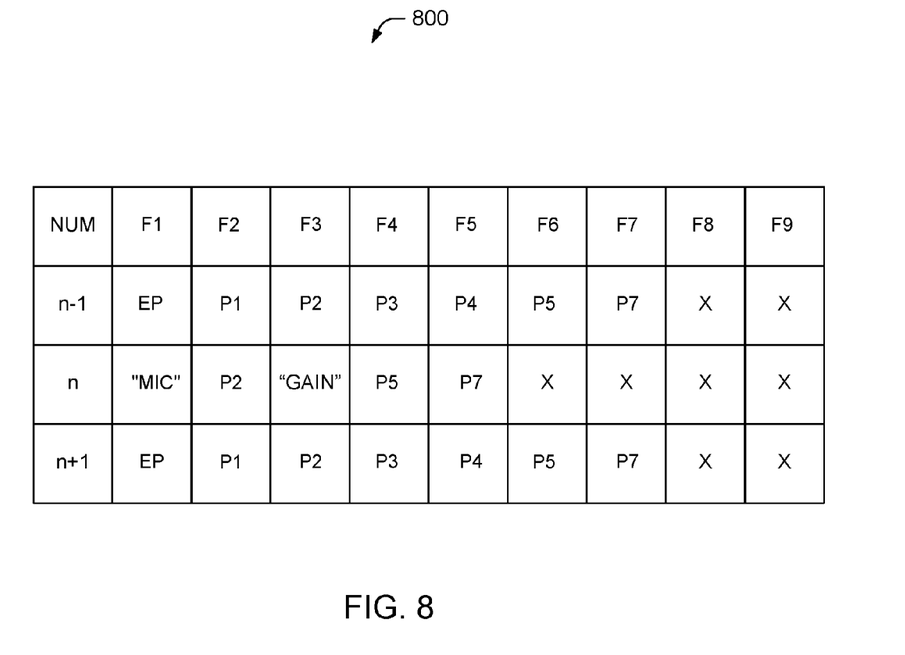
FIG. 8 illustrates an exemplary response format table of the endpoint parameter management architecture.

The EPM module 210 may use the response format table to convert the low-level communications packet into a user desired command format being preconfigured or dynamically configured at the audio mixer and/or multi-channel data acquisition 102. The converted user desired command format may allow a user to review the base command format that has been added or modified based on the user generated commands previously received through execution of the command data file by the EPM module 210. Therefore, the converted user desired command format may represent any serial command, which has different command formats or different data structures, in a predefined common user format having a generic data structure for being reviewed on a mixer-connected output device (e.g., a monitor) either directly or via a serial port such as a USB port of the data terminal 112. In some embodiments, the mixer-connected output device may integrated with the data terminal 112.

Other embodiments of the present invention will be apparent to those skilled in the art after considering this disclosure or practicing the disclosed invention. The specification and examples above are exemplary only, with the true scope of the present invention being determined by the following claims.

I claim the following invention:

1. A system using a multi-channel command and data processing device with two or more inputs and two or more outputs, with a processor and a memory, in communication with a data storage for managing endpoint parameters of one or more input devices and one or more output devices, comprising:

a data terminal providing a plurality of data files including configuration parameters of endpoints;

a plurality of endpoints connected to one or more input devices and output devices, said plurality of endpoints comprising a first endpoint having a first endpoint type and a second endpoint having a second endpoint type; and said multi-channel command and data processing device in communication with said data terminal and said plurality of endpoints, wherein said multi-channel command and data processing device is configured to:
receive said plurality of data files from said data terminal;
open and read said plurality of data files to obtain a first set of configuration parameters corresponding to said first endpoint and a second set of configuration parameters corresponding to said second endpoint;
convert each of said first set of configuration parameters and said second set of configuration parameters into a predefined common data format; and
organize each of said converted first set and second set of configuration parameters into a generic data structure, said generic data structure being compatible with both said first endpoint type and said second endpoint type.

2. The claim according to claim 1, wherein said generic data structure is represented in a text format, a numeric format, or both.

3. The claim according to claim 1, wherein said generic data structure has predefined parameter fields selected from a group comprising of an endpoint type, an endpoint number, a parameter block number, and a parameter number.

4. The claim according to claim 1, wherein said first set of configuration parameters is represented in a first data structure and said second set of configuration parameters is represented in a second data structure, wherein said multi-channel command and data processing device is further configured to verify said first data structure and said second data structure using a predetermined command format table.

5. The claim according to claim 1, wherein said multi-channel command and data processing device is further configured to:
translate said predefined common data structure into a machine-level communications packet having a plurality of parameter fields;
extract values of predetermined parameter fields among said plurality of parameter fields of said machine-level communications packet;
create a response format table based on said extracted values of predetermined fields; and
display said created response format table into a predefined command format table.

6. A computer implemented method to use a system using a multi-channel command and data processing device with two or more inputs and two or more outputs, with a processor and a memory, in communication with a data storage for managing endpoint parameters of one or more input devices and one or more output devices, comprising:
identifying a plurality of data files including configuration parameters of endpoints provided by a data terminal;
identifying a plurality of endpoints connected to one or more input devices and output devices, said plurality of endpoints comprising a first endpoint having a first endpoint type and a second endpoint having a second endpoint type;
receiving, using said multi-channel command and data processing device, said plurality of data files from said data terminal;
opening and reading, using said multi-channel command and data processing device, said plurality of data files to obtain a first set of configuration parameters corresponding to a first endpoint and a second set of configuration parameters corresponding to a second endpoint;
converting, using said multi-channel command and data processing device, each of said first set of configuration parameters and said second set of configuration parameters into a predefined common data format; and
organizing, using said multi-channel command and data processing device, each of said converted first set and second set of configuration parameters into a generic data structure, said generic data structure being compatible with both said first endpoint type and said second endpoint type.

7. The claim according to claim 6, wherein said generic data structure is represented in a text format, a numeric format, or both.

8. The claim according to claim 6, wherein said generic data structure has predefined parameter fields selected from a group comprising of an endpoint type, an endpoint number, a parameter block number, and a parameter number.

9. The claim according to claim 6, wherein said first set of configuration parameters is represented in a first data structure and said second set of configuration parameters is represented in a second data structure, wherein said multi-channel command and data processing device is further configured to verify said first data structure and said second data structure using a predetermined command format table.

10. The claim according to claim 6, further comprising the steps of:
translating, using said multi-channel command and data processing device, said predefined common data structure into a machine-level communications packet having a plurality of parameter fields;
extracting, using said multi-channel command and data processing device, values of predetermined parameter fields among said plurality of parameter fields of said machine-level communications packet;
creating, using said multi-channel command and data processing device, a response format table based on said extracted values of predetermined fields; and
displaying, using a monitor in communication with said multi-channel command and data processing device, said created response format table into a predefined command format table.

11. A method to manufacture a system using a multi-channel command and data processing device with two or more inputs and two or more outputs, with a processor and a memory, in communication with a data storage for managing endpoint parameters of one or more input devices and one or more output devices, the method comprising:
providing a data terminal providing a plurality of data files including configuration parameters of endpoints;
providing a plurality of endpoints connected to one or more input devices and output devices, said plurality of endpoints comprising a first endpoint having first endpoint type and a second endpoint having second endpoint type; and
providing said multi-channel command and data processing device in communication with said data terminal and said plurality of endpoints, wherein said multi-channel command and data processing device is configured to:
receive said plurality of data files from said data terminal;
open and read said plurality of data files to obtain a first set of configuration parameters corresponding to said first endpoint and a second set of configuration parameters corresponding to said second endpoint;
convert each of said first set of configuration parameters and said second set of configuration parameters into a predefined common data format; and organize each of said converted first set and second set of configuration parameters into a generic data structure, said generic data structure being compatible with both said first endpoint type and said second endpoint type.

12. The claim according to claim 11, wherein said generic data structure is represented in a text format, a numeric format, or both.

13. The claim according to claim 11, wherein said generic data structure has predefined parameter fields selected from a group comprising of an endpoint type, an endpoint number, a parameter block number, and a parameter number.

14. The claim according to claim 11, wherein said first set of configuration parameters is represented in a first data structure and said second set of configuration parameters is represented in a second data structure, wherein said multi-channel command and data processing device is further configured to verify said first data structure and said second data structure using a predetermined command format table.

15. The claim according to claim 11, wherein said multi-channel command and data processing device is further configured to:
translate said predefined common data structure into a machine-level communications packet having a plurality of parameter fields;
extract values of predetermined parameter fields among said plurality of parameter fields of said machine-level communications packet;
create a response format table based on said extracted values of predetermined fields; and
display said created response format table into a predefined command format table.

16. A non-transitory program storage device readable by a computing device that tangibly embodies a program of instructions executable by said computing device to perform a method to use a system using a multi-channel command and data processing device, with a processor and a memory, in communication with a data storage for managing endpoint parameters of one or more input devices and one or more output devices, comprising:
identifying a plurality of data files including configuration parameters of endpoints provided by a data terminal;
identifying a plurality of endpoints connected to one or more input devices and output devices, said plurality of endpoints comprising a first endpoint having first endpoint type and a second endpoint having second endpoint type;
receiving, using said multi-channel command and data processing device, said plurality of data files from said data terminal;
opening and reading, using said multi-channel command and data processing device, said plurality of data files to obtain a first set of configuration parameters corresponding to a first endpoint and a second set of configuration parameters corresponding to a second endpoint;
converting, using said multi-channel command and data processing device, each of said first set of configuration parameters and said second set of configuration parameters into a predefined common data format; and
organizing, using said multi-channel command and data processing device, each of said converted first set and second set of configuration parameters into a generic data structure, said generic data structure being compatible with both said first endpoint type and said second endpoint type.

17. The claim according to claim 16, wherein said generic data structure is represented in a text format, a numeric format, or both.

18. The claim according to claim 16, wherein said generic data structure has predefined parameter fields selected from a group comprising of an endpoint type, an endpoint number, a parameter block number, and a parameter number.

19. The claim according to claim 16, wherein said first set of configuration parameters is represented in a first data structure and said second set of configuration parameters is represented in a second data structure, wherein said multi-channel command and data processing device is further configured to verify said first data structure and said second data structure using a predetermined command format table.

20. The claim according to claim 16, further comprising the steps of:
translating, using said multi-channel command and data processing device, said predefined common data structure into a machine-level communications packet having a plurality of parameter fields;
extracting, using said multi-channel command and data processing device, values of predetermined parameter fields among said plurality of parameter fields of said machine-level communications packet;
creating, using multi-channel command and data processing device, a response format table based on said extracted values of predetermined fields; and
displaying, using a monitor in communication with said multi-channel command and data processing device, said created response format table into a predefined command format table.

* * * * *